Jan. 21, 1958   E. F. KOHL ET AL   2,820,265
SHELL MOLD STRUCTURES
Filed Aug. 14, 1952   2 Sheets-Sheet 1

INVENTORS
EVERARD F. KOHL
ZENON KAZENAS
BY
John Mahoney
ATTORNEY

Jan. 21, 1958　　　E. F. KOHL ET AL　　　2,820,265
SHELL MOLD STRUCTURES

Filed Aug. 14, 1952　　　　　　　　　　　　　2 Sheets-Sheet 2

INVENTORS
EVERARD F. KOHL
ZENON KAZENAS
BY
John Mahoney
ATTORNEY

United States Patent Office 2,820,265
Patented Jan. 21, 1958

2,820,265

SHELL MOLD STRUCTURES

Everard F. Kohl, Lakewood, and Zenon Kazenas, East Cleveland, Ohio; said Kazenas assignor to Mercast Corporation, a corporation of Delaware Application August 14, 1952, Serial No. 304,309

23 Claims. (Cl. 22—129)

This application is a continuation-in-part of our applications Serial No. 7,955, filed February 12, 1948, Serial Nos. 113,452 and 114,824, filed August 31, 1949, and Serial No. 257,328, filed November 20, 1951, all now abandoned.

This invention relates to processes for preparing shell mold structures by means of frozen mercury patterns defining the cavity into which objects are to be cast, to mold structures produced by such processes, and to compositions utilized in preparing such mold structures.

As a result of past efforts, there has been developed a commercial method of preparing precision castings by what is known as the "lost-wax" method. However, the "lost-wax" method of precision casting has many serious limitations, including the fundametal limitation imposed by the fact that wax-type impermanent pattern material has a relaively high expansion coefficient of about 9% by volume near its melting or freezing point. As a result, molds formed on wax-type patterns must be made quite thick to resist the large initial expansion forces of the wax pattern when it is brought to melting temperature for removing it from the mold cavity.

Serious difficulties are also encountered when metal having a high melting temperature, such as 1500° C. or more is cast into the cavity of a relatively thick mold formed of a refractory material having poor heat conducting properties because the inner shape-controlling surface layer of the thick mold is subjected to thermal shock and large expansion forces, causing cracks and deformation in its inner surface layer. It is also difficult to remove the relatively large mass of investment material of the mold from the casting.

The "lost-wax" method of preparing precision castings has been confined, therefore, to the production of comparatively small objects having a contour of such shape that it is not necessary for the cast object to contract about parts of the mold during cooling.

In its fundamental aspects, the present invention is based on the discovery that the very small dimensional change of frozen mercury near its melting or freezing temperature, makes it possible to form on frozen mercury patterns thin-walled molds that would crack if formed around a pattern of wax material, when it expands as it is brought to melting temperature. The invention is also based on the further discovery, that such thin-walled shell mold may be formed on frozen mercury patterns with much finer refractory particle material, such as zirconite, stabilized and unstabilized zirconium oxide or beryllium oxide, resulting in mold cavities of very fine surface finish and yielding castings of correspondingly fine surface finish. The invention also involves the discovery that such thin-walled molds formed on frozen mercury patterns exhibit high thermal shock resistance and do not crack when casting into them, metals of high melting point, such as stainless steel alloys. The invention also involves the further discovery that such thin-walled shell molds may be given high porosity which is of great advantage in providing for the escape of gases developed when molten metal of high melting point is poured into the mold cavity.

An important phase of the present invention is to provide a thin shell mold produced by applying one or more strata of a coating composition to a frozen mercury pattern which forms thereon a relatively thin starta of a shell mold with a casting cavity into which molten material is to be cast. Because of the low thermal expansion coefficient of mercury, a frozen mercury pattern may be liquefied and removed from comparatively thin shell molds and consequently in preparing shell molds in which frozen mercury is utilized as the pattern material, it is only necessary to make the walls of the shell mold adjacent the pattern of sufficient thickness to resist the impact of molten material cast within the mold cavity. The shell mold may therefore be made sufficiently thin so as to yield when the molten material cast into the mold cavity contracts about portions of the mold during cooling and imposes strains on at least some of the shell wall portions.

This thin shell mold structure conforming to the shape of the object to be cast, is composed of a coating composition comprising a predominant amount of refractory particles and a suitable binder or binders to form a thin, hard, yieldable shell. Because of the thinness of the shell mold, the vaporization of any solvents or carriers present in the coating composition is expedited, thereby providing rapid drying and hardening of the mold.

According to a phase of the invention, the thin shell mold is supported by a backing and support structure comprising a backing layer adjacent to and contacting at least the major part of the exterior of the thin shell mold and having a composition which permits the inner shell mold to yield somewhat during the casting process. The support structure is effective, however, in resisting substantial lateral displacement of the inner shell mold when adjacent portions of said backing layer yield or are movable relatively to adjacent exterior surface portions of the shell wall contacted thereby.

In one form of the invention, the thin shell mold formed around the frozen mercury pattern is provided with such backing and supporting structure as follows: a thin single-layer mold having yieldable wall portions is placed into a flask, and loose particles of refractory material are poured or sifted in between the shell mold and the flask to provide the backing structure. The mass of loose refractory particles forms a support or backing structure which has the characteristic of permitting the walls of the shell to yield somewhat when cast metal sections contract when cooling about portions of the shell walls, the refractory particles having irregularly-shaped surfaces which resist lateral displacement relative to adjacent particles, thereby providing a lateral backing for thin shell mold walls while permitting them to withstand thermal shock and expansion forces when molten metal is cast into the mold cavity.

The loose refractory particles of the backing structure are of such character that they do not tend to spread in lateral direction, and as a result the shell wall portions are not subjected by the mass of the backing particles to forces tending to flex the shell wall portions in the direction toward the cavity space bounded thereby. The refractory particles also absorb residual carriers or solvents present in the shell mold, thereby accelerating the drying or hardening of the shell mold.

In applications where it is desired or required to form a mold structure having greater strength than the thin single-layer shell mold, the frozen mercury pattern with the single-layer shell formed thereon is further coated with a second shell layer of refractory material of substantial strength to provide with the inner shell layer a self-supporting mold structure. With such double-layer shell mold, the inner shell mold layer may be made of less thickness than the single-layer shell mold.

The composition and characteristics of the second or outer mold shell layer are so controlled that the outer backing shell layer shall provide resistance to lateral displacement of the inner shell wall portions when molten metal is cast into the mold cavity. The overall thickness of such double-layer shell mold may be kept small enough, such as about 1/32 to 1/8 inch, up to about 1/4 inch so that wall portions of the shell mold may yield when cast metal cools and contracts about portions of the mold. However, in case of molds for large castings requiring large masses of molten metal to be poured into the mold cavity, a greater mold thickness, up to about 3/8 or 1/4 inch may be used.

When large size castings are to be made, the frozen mercury pattern may be utilized to form thereon a thin inner shaving shell layer, separated from an outer strong backing shell layer by an investment buffer shell layer. According to a phase of the invention disclosed herein, the buffer shell layer is formed of relatively loose refractory particles arranged to permit wall portions of the inner shaping shell layer to yield somewhat when the metal casting cools and contracts about portions of the mold, while the outer strong backing layer serves to prevent substantial lateral displacement of inner shell wall portions when the molten metal is cast into the mold cavity.

According to one phase of the invention, the thin shell-like mold structure or the inner shell layer of a two shell-layer mold is formed on a frozen mercury pattern of the object to be molded by coating the pattern with a special shell-forming coating composition which comprises refractory particles constituting a predominant amount of the solid ingredients of the composition, a raised temperature binder, an organic resinous binder, and a liquid carrier for the ingredients of the composition. The raised temperature binder is so chosen as to become effective in binding the refractory particles together at a temperature higher than the temperature of the frozen mercury and below the temperature of molten metal to be cast into the mold, such as at temperatures between approximately 150° to 600° C. and which after becoming effective retains its effectiveness as a binder for the refractory particles at higher temperatures up to the fusion temperature of substantially all metals and alloys, as well as at low temperatures. The organic resinous binder is so chosen as to have the physical property of being adherent to a frozen mercury pattern and of being coherent to a previously applied layer of the same or similar composition at temperatures below the freezing point of mercury and of being effective in binding the refractory particles and the raised temperature binder together at temperatures ranging from below the temperature of frozen mercury up to a temperature at least as high as that at which the raised temperature binder becomes effective as a binder for the refractory particles. It is also desirable that the organic resinous binder shall have the property of becoming modified, either physically or chemically, to at least partially disintegrate, evaporate, or volatilize at temperatures above that at which the raised temperature binder becomes effective as a binder for the refractory particles to provide vapors which exude through the refractory coating material to provide a porous shell mold. Although it is important that the organic resinous binder shall be adherent to the frozen mercury pattern and shall have the property of causing the wall portions of the shell mold to adhere to the frozen mercury pattern and to provide a smooth cavity surface, the adherent forces of the resinous binder which cause the shell mold surface to adhere to the frozen mercury pattern should, however, be of such magnitude only that when the frozen mercury melts, the surface tension of the liquified mercury particles shall be sufficient to break their bond to the facing surface of the shell mold without in any way impairing its surface characteristics.

The liquid carrier of the shell-forming composition is so chosen as to be in the liquid state at temperatures at least as low as that of the frozen mercury pattern and to have a boiling point below normal temperature, such as from approximately 15° to 30° C. at an atmospheric pressure, and particularly one having a boiling point below approximately 0° C. Shell mold structures of the invention may also be produced in which the raised temperature binder is omitted from the shell-forming composition, in which case the shell mold is impregnated with the raised temperature binder after the frozen mercury is liquified and removed from the cavity of the previously set shell mold structure.

When materials, such as metals which have a fusion temperature below the temperature at which the organic resinous binder is modified to form a vapor, or when plastic materials, such as phenolic condensation products or polyester gums, are to be cast or formed in the shell mold, the raised temperature binder may be omitted. The raised-temperature binder may also be omitted when it is desired to cast the molten metal into the mold cavity while the shell mold is maintained at a low temperature. When a shell mold structure with three shell layers is provided, the raised temperature binder is omitted from the intermediate coating layer to give looseness to the refractory particles of the intermediate shell layer after the organic resinous binder has been modified or driven off at raised temperatures so that the inner shell layer may yield when molten metal is cast into the mold cavity.

The various phases of the invention will be better understood from the following description and exemplifications thereof with particular reference to the drawings, in which—

Figure 1:
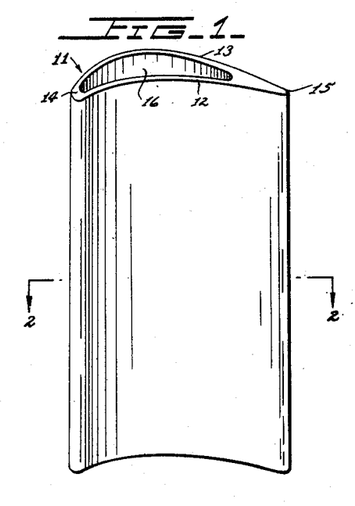
Fig. 1 is an isometric view of a vane of gas turbine to be cast in accordance with the invention.
Figure 2:
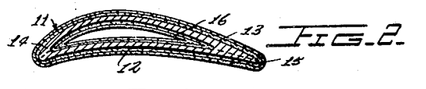
Fig. 2 is a cross-sectional view of the vane, and of its frozen mercury pattern (Fig. 3) shown with a shell mold of the invention formed thereon.

Referring to Figs. 1 through 4, there will now be described the phase of the invention wherein one form of a thin-walled shell mold is formed on a complex frozen mercury pattern. Figs. 1 and 2 indicate, by way of example, a gas turbine vane 11 having a hollow interior 16 and which is to be cast in accordance with the invention. The vane 11 has an air-foil contour with a generally concave thin blade section 12 and a generally convex thin blade section 13 joined along the front edge region 14 and rear edge region 15. The vane 11 may also have an axial twist along its length.

If a frozen mercury pattern of such a turbine vane is difficult to produce from a single permanent master mold, it may be produced by making separate frozen mercury patterns of sections 12 and 13 in separate particle permanent molds. The separate sectional mercury patterns 12 and 13 may then be joined or welded at mating surfaces indicated by dashed lines in Fig. 2 to form a single, continuous integral frozen mercury pattern. The several pattern sections may be provided along their mating surfaces with suitable interfitting male and female aligning elements to facilitate ready alignment of the several pattern sections into the desired complex pattern. Because of the unique characteristics of frozen mercury, such individual frozen mercury pattern sections, when brought into abutment along their mating surfaces, will become united and welded into the self-supporting complex frozen mercury pattern of the desired object which would be difficult to produce with a single permanent master mold.

Such gas turbine vanes are made of alloy metal having high hot strength and a corresponding high melting temperature. When such alloy metal is cast into the mold cavity, it will, upon solidifying, contract about the core portion of the mold which gives shape to the hollow interior of the vane. Unless the walls of the core portions of the mold structure are thin enough to yield, the thin walls of the casting may be subjected to cracks as the molten metal cools and tends to contract about the unyielding core portions of the mold structure. By making the mold structure in the form of a thin shell mold which yields when subjected to the contracting forces of the solidifying molten metal, these difficulties are avoided.

Figure 3:
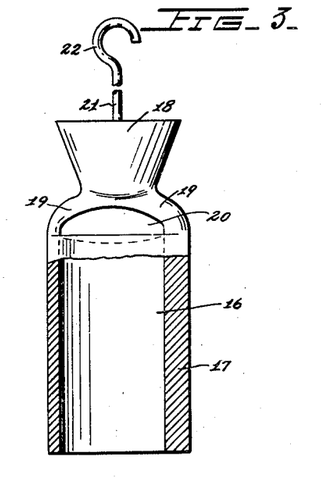
Fig. 3 is a partial sectional view of a frozen mercury pattern used in making a shell mold for the vane of Fig. 1.

Fig. 3 shows a cross section of the frozen mercury pattern 17 of vane 11 with a sprue 18 of frozen mercury attached thereto by means of frozen mercury arms 19 which bridge the narrow border regions of the vane-shaped frozen mercury pattern. This bridge arrangement provides coating passages to the inner surfaces of the hollow frozen mercury pattern 17 facing the hollow interior 16, which inner pattern surfaces are to be coated with the shell-forming coating compositions. A rigid metal hook 22 having a shank which is frozen in the sprue gate portion 18 of the frozen mercury pattern, is utilized in manipulating the frozen mercury pattern while coating it with the shell mold forming composition. Frozen mercury in the pure state is especially suitable for practicing the invention, although it is not limited thereto as long as the impurities do not affect physical properties of mercury which render it suitable for practicing the invention.

The frozen mercury pattern 17 is now ready for coating with the mold forming composition. This is accomplished by repeatedly immersing the frozen mercury pattern in, or pouring over its surface a slurry of the coating composition maintained at a temperature below the freezing point of mercury. The coating slurry comprises a liquid carrier holding dispersed or dissolved therein fine particles of refractory material, a raised temperature binder for the refractoy paticles which is ineffective at the freezing temperature of mercury but which becomes effective as a binder for the refractory particles at raised temperatures, and an organic resinous binder that is adherent to the frozen mercury pattern at temperatures below the freezing point of the pattern and which has the properties of binding the refractory particles and the raised temperature binder together at temperatures ranging from below the freezing point of mercury up to the temperature at which the raised temperature binder becomes effective as a binder for the refractory particles and of causing the bound particles to adhere to the frozen mercury pattern. The raised temperature binder is so chosen that it becomes effective as a binder for the refractory particles at temperatures below that at which the organic resinous binder becomes modified to impair or lose its binding properties. The liquid carrier is chosen to have a low boiling point and to volatilize in a short period of time at temperatures in the range from below the freezing temperature of mercury up to about normal temperatures, such as —50° C. to —40° C. up to 0° C.

The viscosity of the refractory slurry depends upon the size and complexity of the frozen mercury pattern to be coated. For example, the slurry must be thin enough to readily penetrate all openings and all narrow corners. Between each successive coating, by immersion or dipping of the pattern in the slurry by spraying it, a period of time is allowed to at least partially dry the applied coating layer or film. The successive coating and drying operations are carried on until a shell layer of the desired thickness has been formed around the exposed surface of the frozen mercury pattern. After the last layer or film is applied, the shell layer is dried.

Both the coating and drying of each shell layer stratum should be carried on in an atmosphere refrigerated to well below the freezing point of the mercury pattern material. In particular, the drying of the shell mold layer should be effected at temperatures below the boiling point of the carrier so as to provide a smooth film or shell layer. The drying may be expedited by circulating through the drying space where intermittent drying takes place, an atmosphere of air refrigerated to below the freezing temperature of the mercury pattern material and below the boiling point of the carrier. The vapor of the liquid carrier absorbed into the refrigerated atmosphere may be recovered therefrom by conventional compression techniques or the like, whereby the liquid carrier may be used again to form the coating composition. The continuous circulation of the refrigerated atmosphere from which the carrier vapors have been removed, also reduces the vapor pressure of the liquid carrier, thereby expediting the volatilization of the liquid carrier from the coating layers. A suitable degree of vacuum may be applied to the drying space for expediting the volatilization of the carrier.

Figure 4:
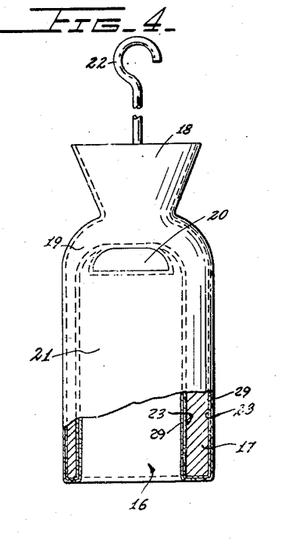
Fig. 4 is an elevational view, partly in cross-section of the frozen mercury pattern of Fig. 3, with one type of a shell mold of the invention formed thereon.
Figure 5:
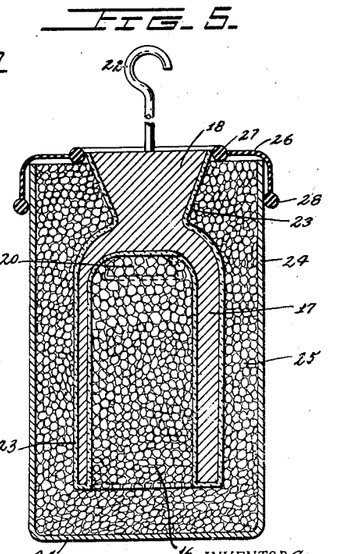
Fig. 5 is a vertical cross-section of the frozen mercury pattern of Fig. 3 with another type of shell mold formed thereon, as held in a flask by a mass of loose refractory particles.

Figs. 4 and 5 show a substantially self-supporting mold structure with thin shell walls consisting of the shell layers formed in accordance with the invention over the frozen mercury pattern of the vane of Fig. 3. The thin shell mold generally designated 21 has an inner thin shell layer 23 and an overlaying supporting or backing shell layer 29 forming with the inner shell layer 23 a self-supporting shell mold structure from which the frozen mercury pattern 17 may be readily removed by heating to above its melting point and pouring it out of the mold cavity. The two layer shell mold 21 so formed is sufficiently thin to yield when molten metal cast into the mold cavity contracts about parts of the shell mold such as the inner core of the shell mold 21, thereby preventing formation of cracks in the casting. When the frozen mercury pattern of the object to be cast is comparatively thin, as in the case of the thin wall gas turbine vane, the walls of the shell mold of the type shown in Fig. 4 may have an overall thickness from about ⅟₁₆ to about ³⁄₁₆ inch.

Referring to Fig. 2, the inner shell layer 23 is first formed over the exposed surfaces of the frozen mercury pattern 17 by applying thereto several strata of the slurry-like shell-forming coating composition, each coating stratum being at least partially dried before applying thereover the next stratum of the coating composition in the manner explained hereinabove.

After drying the exterior stratum of the inner shell layer 23, the outer supporting backing shell layer 29 is formed thereover with a modified shell-forming, coating composition having characteristics similar to that used for forming the inner shell layer 23. In order to give the outer backing shell layer 29 relatively great strength, the refractory particle material of the backing layer coating composition is chosen so that it contains partly coarse size particles and partly fine size particles. Such double shell layer mold may be made with a very thin inner shell layer of fine refractory particles, the outer backing shell layer 29 with its coarser refractory particles providing the required strength, while the combined overall thickness of the two shell layers 23, 29 is small enough to permit wall portions of the shell mold to yield when the molten metal cast into the mold cools and contracts about portions of the mold which it surrounds. By way of example, for cast objects of the type described such as the gas turbine vanes or gas turbine buckets, good results are obtained with the inner shell layer 23 made with a wall thickness of about 1/64 to 1/32 inch, and the overall thickness of the two shell layers 23, 29, about 1/16 to 3/16 or 1/4 inch.

According to a phase of the invention, explained in connection with Fig. 5, frozen mercury patterns may also be used to form thereon thin single-layer shell molds, the walls of which are backed in a special way by a mass of relatively loose refractory particles. Fig. 5 shows the same frozen mercury pattern 17 of the hollow vane, Fig. 3, having formed thereon only a single layer shell mold 23 corresponding to the inner shell layer 23 of the two-layer mold of Figs. 2, 4. The thin shell mold 23 of Fig. 5 is formed over the frozen mercury pattern 17 in the same way as the inner shell layer 23 of the two layer shell mold 21 shown in Figs. 2, 4. The walls of the thin shell mold 23 of Fig. 5 are made sufficiently thin to yield when molten metal contracts about part of the shell mold in cooling thus preventing damage to the casting and cracking thereof. In case of frozen mercury patterns for thin castings, such as the vane of Figs. 1, 2, the walls of the shell mold 23 may have an overall thickness from about 1/32 to about 1/8 inch.

According to the invention, a single-layer thin shell mold of the type shown in Fig. 5, is provided with a support or backing structure which aids in resisting lateral deformation of the thin mold walls under the impact of the hot molten metal cast into the mold cavity, while permitting the shell wall portions to yield in the direction of the shell wall surfaces. As shown in Fig. 5, the coated pattern, with the thin shell mold 23 formed thereon, is suspended in a container or flask 24 and light-weight backing material 25 consisting of a mass of loose refractory particles is poured or blown into the flask 24 until the pattern is completely embedded in the backing material 25. The loose refractory particles are also poured through aperture 20 into the hollow interior space 16 of the shell mold to provide a support backing for the core portion of the shell mold in the hollow interior of the pattern. The backing material is previously chilled to preclude premature melting of the frozen mercury. To expedite the vaporization of any residual liquid carrier or solvent that may remain in the shell mold, the flask 24 with its cover 26, or in general, the backing enclosure walls, are provided with surface perforations which permit ready escape of gases and vapors from the exterior while retaining in position the backing mass of loose refractory particles 25.

The loose support backing material is selected from an inorganic material composed of loose refractory particles having a low specific gravity and irregular surfaces and having the property of substantially resisting displacement relative to adjacent particles so that a vertically piled mass of such refractory particles will not be subjected to any substantial forces causing the lateral flow and displacement of the particles toward the shell mold walls and deformation thereof toward the shape-giving interior of the mold cavity.

The mass of loose refractory particles forms a backing structure which permits the wall portions 23 of the shell mold to yield somewhat when cast metal sections contract about them when cooling. Furthermore, because of their resistance to displacement relative to each other, the tendency of a vertically piled-up mass of refractory particles to flow in a lateral direction will be only slight.

Consequently, the thin shell mold walls, when empty or when the mercury pattern liquefies, will be subjected to only minimized forces tending to bend or collapse them toward the interior of the mold cavity. The backing mass of loose refractory particles also provides an absorbing medium for any residual liquid carrier or solvent that may remain in the thin shell mold after the drying process.

The requirement for a good support backing may be met by materials, such as cinders, crushed bloated clay, shale or slate particles, ground titanium, aluminum oxide, ground fused quartz, and the like, or a treated micaceous material that expands under the influence of heat, such as vermiculite. For example, vermiculite particles may be ground and screened to the desired size and coated with a liquid suspension of a heat-hardenable inorganic substance, such as an aqueous solution of phosphoric acid ranging in strength from 10% to 85%. The coated vermiculite may then be spread on a screen and heated in a furnace to a temperature of approximately 1000° C. for fifteen to thirty minutes to harden the applied coating substance. The treated vermiculite particles are then ground and screened to obtain backing particles of the desired size.

The refractory particles may also be mixed with water glass, such as an aqueous solution of sodium or potassium silicate having a specific gravity ranging from approximately 30 to 42° Baumé. The coated refractory particles are then spread on a screen and heated to a temperature of from approximately 535° to 1100° C. to harden the silicate coating applied to the refractory particles.

Refractory particles having an average particle size from minus 4 mesh to minus 12 mesh are suitable for use as a backing structure for a shell mold of the type described. When the coated pattern is of small size and is complicated in shape, small-sized particles, such as minus 8 mesh, plus 32 mesh, are satisfactory, whereas larger-sized particles, such as minus 4 mesh and plus 16 mesh are satisfactory when the shell mold is simple in shape, or is of a larger size.

To prevent the loose supporting particles from being displaced during handling of the flask, a cover 26 is placed over the top of the flask 24. The cover 26 may be formed of any suitable material, such as fabric, plastic, rubber, or metal plate, of steel, for instance, and when assembled in place, it has a reinforced portion 27 adjacent that portion of the shell mold 23 formed around sprue 18, and a downwardly extending flange provided with a reinforcement 28 engaging the upper sides of the flask. The cover may also consist of a partible metal plate, the parts of which may be brought together around the sprue 18 to fit over and be secured to the top of the flask.

The flask 20 holding the shell mold with the mercury pattern embedded in the mass of loose backing particles is now raised to a temperature above the freezing point of mercury in order to liquefy the mercury. The frozen mercury may be quickly melted by bringing liquid mercury into contact with the mercury in the mold cavity. Because of the thermal conductivity of the mercury, the frozen mercury pattern is readily liquefied in this process. Another and effective method of liquefying the frozen mercury pattern is to place or pass the flask or the mold containing the frozen mercury pattern through a high-frequency induction field.

After the mercury pattern has been liquefied, the mercury is poured from the shell mold by inverting the flask. The frozen mercury pattern may also be provided with a narrow sprue outlet portion at its bottom, in which case the liquid mercury may be drained from the bottom of the mold. The small aperture remaining in the bottom portion of the mold may be plugged with refractory material prior to casting the molten metal into the mold cavity. The cover 26, if formed of a heat decomposable material, may be removed from the flask after pouring out the mercury.

To harden the shell mold and render it resistant to molten metal having a high melting point, the flask 24 with the shell mold 23 and backing mass 25 held therein is now heated in a furnace to a sufficiently high temperature to cause the raised temperature binder to become effective as a binder for the refractory particles in the shell mold and to modify the organic resinous binder as by driving it off, or vaporizing it, to thereby impart porosity to the shell mold. The baking or firing temperature, which may vary between approximately 540° to 1250° C. as well as the time required for baking depend upon several factors, such as the size and thickness of the shell mold, the temperature of the molten metal to be cast, and the hardness of the mold surface required.

When the shell mold has been properly hardened, the flask with the mold contained therein, is removed from the furnace and mold is now ready for casting. When high melting temperature metal is to be cast, or where thin sections are involved, the metal is cast into the shell mold while the mold is still hot. In casting metal having a low fusion point, it is also desirable to cast the metal into a hot mold in order to prevent solidification of the metal before it completely fills the mold.

After the cast metal has been cooled and solidified, the casting may be retrieved by pouring out the loose refractory particles from the flask. A large portion of the shell mold may be easily broken away while the remainder of the refractory mold may be removed by blasting, such as sand blasting.

According to another phase of the invention, the molten metal is cast into a shell mold of the type described above while the latter is maintained at temperatures below 0° centigrade, in which case the shell mold may be made without the raised temperature binder. An auxiliary freezing liquid having a higher freezing point than mercury, such as water or a mixture of water and alcohol, may be poured into the mass of loose refractory particles 25 within the flask 24. The flask 24, together with the loose refractory material and the frozen mercury pattern, is treated as by placing it in a cold room at a temperature which freezes the auxiliary liquid but causes the mercury to liquefy, in which case the liquefaction of the mercury aids in freezing the auxiliary liquid. The flask, together with the frozen refractory particles and the shell mold, are then inverted to remove the liquefied mercury, the refractory particle backing remaining bound together by the frozen auxiliary liquid and held in place by the cover 26, and the flask containing refractory particles bound together by the ice and the shell mold is returned to the cold cabinet and subjected to a temperature ranging from —40° to —100° C. or lower, for about one-half hour. A metal having a high fusion temperature may then be cast into the mold cavity, such as stainless steel or an alloy commercially known as Colomonoy 6, which consists essentially of 65% to 75% nickel, 13% to 20% chromium, and from 2.75% to 4.75% boron, and which has a melting point of approximately 1050° C.

Figures 6, 7:
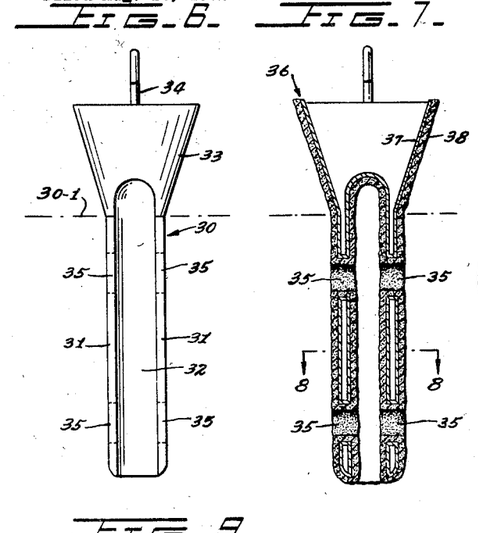
Fig. 6 is a front view of another frozen mercury pattern.
Fig. 7 is a central sectional view of a shell mold formed on the frozen mercury pattern of Fig. 6 in accordance with the invention.
Figure 8:
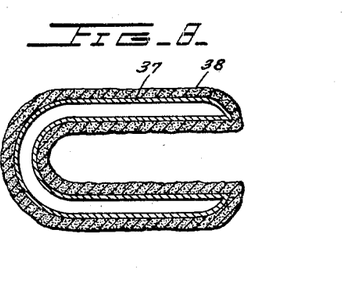
Fig. 8 is an enlarged cross-sectional view on the line 8—8 of Fig. 7.

Figs. 7, 8 show a thin walled two-layer shell mold of the invention formed on a frozen mercury pattern of a receiver part of a rifle shown in Fig. 6. The receiver pattern 30 of Fig. 6 is used to cast the receiver part of a rifle, indicated in Fig. 6 below the dash-dot line 30–1. Such rifle receiver has very thin side walls, only one thirty-second ($\frac{1}{32}$) of an inch thick, and the inner surface has special guide ways, which heretofore had to be produced by accurate machining operations. The frozen mercury pattern 30 has a gate portion 33 forming a pattern for the mold gate into which the shank of a rigid metal hook 34 is embedded during the freezing of the mercury. Each of the two side walls 31 of the pattern has two spaced openings 35.

Figs. 7 and 8 show the shell mold 36 of the invention which has an inner thin shell layer 37 and an outer supporting shell layer 38 which were formed on the surfaces of the frozen mercury pattern shown in Fig. 6, including its aligned openings 35 in the manner explained in connection with Figs. 2, 4. The inner shell layer 37 is made very thin, and the outer shell layer 38 provides the required strength, while the combined thickness of the two shell layers 37 and 38 is small enough to permit wall portions of the shell mold to yield when molten metal cast into the mold cools and contracts about portions of the mold which it surrounds. By way of example, for cast objects which are similar to the pattern shown in Fig. 6, having a wall thickness of about $\frac{1}{16}$ to $\frac{1}{4}$ inch, the inner shell layer may have a thickness of $\frac{1}{64}$ to $\frac{1}{16}$ of an inch, and the over-all thickness of the two shell layers 37 and 38 of the completed shell mold may be $\frac{1}{16}$ to $\frac{1}{4}$ of an inch thick.

It will of course be understood that as the thickness of the frozen mercury pattern of the object to be cast is increased, the thickness of the shell layer, or the combined thickness of the two shell layer, which is applied to the pattern must also be increased to provide upon the liquefaction and removal of the mercury a shell mold of sufficient thickness to resist the impact of the molten metal cast into the shell mold which in such case will be larger in amount than when a thin casting cavity is provided. When the thickness of the frozen mercury pattern is large, it is not necessary, however, to increase the thickness of the applied shell layer, or shell layers, in the same ratio as the thickness of the pattern is increased because in such cases only a slight increase in the thickness of the shell layer, or combined shell layers, will provide ample strength in the shell mold which is finally formed to resist the impact of the larger amount of molten metal which is cast into the shell mold, and even when the pattern of the object to be cast is comparatively large, it is not necessary to provide a shell mold having an average thickness greater than approximately $\frac{1}{4}$ to $\frac{3}{8}$ of an inch because shell molds having such thickness will resist the impact of a large amount of molten metal cast into the shell mold and will be thin enough to yield when metal which is cast into the cavity of the shell mold contracts about portions of the shell mold during cooling. When a shell mold having an average thickness of $\frac{1}{4}$ to $\frac{3}{8}$ of an inch is provided, the average thickness of the inner shell layer when two shell layers are provided may vary from approximately $\frac{1}{32}$ to $\frac{1}{16}$ of an inch in thickness.

When molten metal of high temperature is cast into the mold cavity shown in Figs. 7 and 8 to form concave or hollow cast metal articles, it contracts upon cooling about portions of the shell mold defining the annular surfaces which form slots or openings 35 and these portions of the shell mold must be thin enough to yield to prevent cracks forming in the concave portions of the casting. The molten metal in the mold cavity, upon solidifying to form the casting, also contracts about those portions of the shell mold which define the concave inner surfaces of the cast metal article and those portions of the shell mold must also be thin enough to yield to prevent cracks from forming in the thin side portions of the casting during cooling. The portion of the shell mold structure where the highest contraction of the cast metal takes place, such as the slot sections 35, may be made in a single shell layer, while other portions of the mold may consist of two shell layers, suitable masks or removable blocking elements being applied to the slot sections 35 when the second shell layer is formed on other parts. The outer shell layer is formed of a coating composition similar to that used in making the inner layer but in which the refractory material is partly in the form of finely divided particles and partly in the form of relatively coarse particles.

Figure 9:
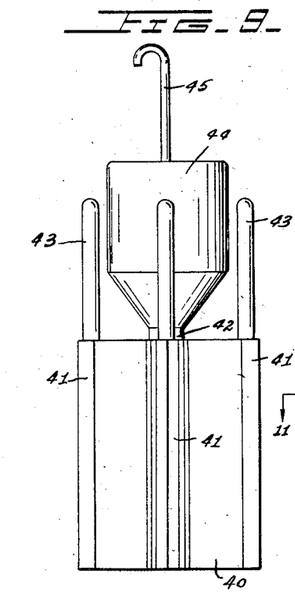
Fig. 9 is an elevational view of another frozen mercury pattern.
Figures 10, 11:
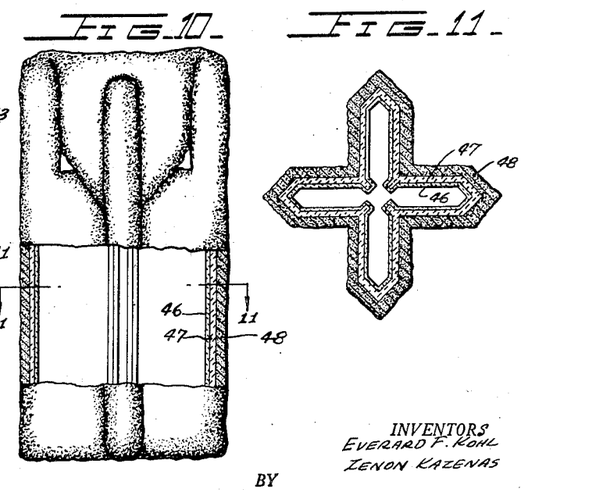
Fig. 10 is a similar view of a shell mold formed in accordance with the invention on the frozen mercury pattern of Fig. 9.
Fig. 11 is a cross sectional view along line 11—11 of Fig. 10.

According to a further phase of the invention, in cases requiring still larger self-supporting mold structures, the shell molds of the invention are made out of three shell layers, as shown by way of example in Figs. 9, 10 and 11. The frozen mercury pattern 40 of the object to be cast has four wings 41 extending from a central body part 42. The several elements of the structure have sharp edges and smooth outside surfaces and are of relatively intricate designs.

The four wings 41 of the pattern have at their outer ends rod-like upward extensions 43, serving as pattern portions for four mold sprues. A central portion 44 extending from the central pattern portion 42 of the object to be cast forms a pattern for the mold gate. A metal hook 45 is frozen into the mercury pattern for handling it.

Figs. 10 and 11 show a three-layer shell mold of the invention formed with the frozen mercury pattern of Fig. 9. It comprises a thin inner shell layer 46, a thin intermediate buffer layer 47, and an outer shell layer 48. The buffer layer 47 is formed of relatively movable or loose refractory particles which while resisting lateral displacement of the inner shell layer 46 permits it to yield slight when hot molten metal is cast into the shell mold. It is particularly provided, however, and is of sufficient thickness to permit the inner shell layer to yield when molten metal which is cast into the mold contracts about portions of the shell mold or about cores or inserts in the cavity of the mold during cooling. The outer shell layer 48 serves as a backing support for the inner and buffer shell layers and prevents substantial displacement of the inner shell wall portions when molten metal is cast into the mold cavity.

The shell mold of the three-layer type is designed particularly for the formation of comparatively large castings although it is not limited thereto and must of course be thick enough to resist the impact of molten metal cast into the shell mold. In providing shell molds for preparing even large castings, however, the over-all thickness of the shell mold need not be greater than approximately 1/4 to 3/8 of an inch to resist the impact of molten metal cast into the mold. In general, the thickness of the inner shell layer may vary from approximately 1/64 to 1/8 of an inch, the buffer layer may vary in thickness from approximately 1/50 to 1/20 of an inch, and the outer shell layer may be of sufficient thickness to provide an over-all mold thickness varying from approximately 1/8 to 3/8 of an inch.

Since the over-all thickness of the shell mold structure, whether consisting of two or three shell layers, need not be greater than about 1/8 to 3/8 of an inch to resist the impact of molten material, such shell molds may be placed in a mass of loose freely flowing sand, the combined thicker shell walls of the mold structure providing the desired strength which prevents lateral deformation of the thin walls of the inner shape-defining shell layer.

According to the invention, the shell-forming coating compositions which are or may be utilized in preparing the inner shell mold layer of the invention comprise refractory particles in proportions consistituting a predominant amount of the solid ingredients of the composition, a raised temperature binder that is ineffective as a binder for the refractory particles at the freezing temperature of mercury but which becomes effective at or above normal temperatures and which after becoming effective binds the refractory particles together up to the casting temperature of substantially all metals and alloys as well as at low temperatures, and an organic resinous binder having the properties of being adherent to a frozen mercury pattern at temperatures below the freezing point of the pattern and being coherent to previously applied layers or films of the same or a similar composition at temperatures below the freezing point of mercury. The organic resinous binder must also be capable of binding the refractory particles and the raised temperature binder together at temperatures ranging from below the freezing point of mercury up to the temperature at which the raised temperature binder becomes effective as a binder for the refractory particles. It is also desirable that the organic resinous binder shall have the property of becoming modified under the influence of heat, such as by decomposition or vaporization, to provide vapors which exude through the applied coating to provide a porous shell mold. Throughout the entire baking period, the raised temperature binder which is utilized should become effective as a binder for the refractory particles at temperatures below that at which the organic resinous binder becomes modified. In preparing the shell mold, however, it is not essential that the raised temperature binder shall form part of the coating composition because after the mercury has been liquefied and removed from the coating to provide the mold cavity, the shell mold may be impregnated with a binder that becomes effective as a binder for the refractory particles at raised temperatures.

To enable the composition to be applied in the form of a slurry to the frozen mercury pattern, a carrier for the solid ingredients of the composition is provided that must be in the liquid state at tempertures at least as low as that of the frozen mercury pattern and which has a boiling point below normal temperatures so that it will volatilize in a short period of time at temperatures below the freezing point of the pattern.

Any suitable refractory material that may be formed into fine particles and which is resistant to high temperatures may be used in shell-forming coating compositions for preparing the shell molds of the invention. Among such refractory materials are zirconia (zirconium oxide), particularly, in its stabilized form, zirconium silicate, silica, chromite, magnesium oxide, aluminum silicate, such as sillimanite or mullite, alumina, ground quartz, flint, silicon carbide, a mixture of two or more of such materials, or a mixture of magnesium oxide and calcium oxide. Very good results are obtained by using stabilized zirconia or a refractory silicious material, such as zirconium silicate. Good results are obtained with the refractory particles for mining from approximately 85% or 95% or more of the normally solid ingredients of the composition.

In preparing the coating composition for application as coating strata to a frozen mercury pattern to build up a coating to form a thin, single layer shell mold, such as shown at 23 in Fig. 5, or the inner shell layer 23, 37 or 46 of a shell mold structure consisting of two or more shell layers, such as shown in Figs. 4, 7 and 10, the refractory particles should be sufficiently fine as to provide a smooth hard mold cavity surface so that when metal is cast into the mold cavity a metal casting having a smooth surface will be obtained. Particles of an average size from minus 60 mesh to plus 1000 mesh (passing through screens of 60 to 1,000 meshes per square inch) are suitable. Extremely fine refractory particles, however, are not necessary as a comparatively smooth surface will be obtained when the refractory particles are of a size from minus 140 mesh to about minus 350 mesh. When an extremely fine refractory material is used, the shell mold is not as porous as when made with refractory material of somewhat larger particle size, and the mold is liable to crack during firing, or when molten metal is cast into the mold cavity. When extremely fine particles are utilized, it is desirable, therefore, to have coarser particles mixed therewith in amounts ranging from 80% to 90%.

A suitable low-temperature binder for the refractory particles at temperatures ranging from below the freezing temperature of the frozen mercury pattern up to at least normal temperatures and which has the physical properties of being adherent to a frozen mercury pattern and coherent to additional layers or films of the same or an equivalent composition at temperatures below the freezing point of mercury, is an organic resinous material consisting predominantly of carbon and hydrogen which contains some oxygen atoms, such as polymerized n-butyl-methacrylate, high or low viscosity polymerized isobutyl-methacrylate, polymerized vinyl acetate or ethyl cellulose that has been ethylated to a material extent, such as containing, on the average, one to three ethyl groups per glucose unit. An organic resinous material consisting predominantly of carbon and hydrogen but which contains some nitrogen atoms may also be employed, such as the copolymers of acrylonitrile and butadiene ranging in proportions from approximately 33% acrylonitrile and 67% butadiene to 40% acrylonitrile and 60% butadiene. All of the foregoing organic resinous binders which are suitable for use as a low temperature binder in investment coating compositions of the invention are of the synthetic type. The polymer of butadiene alone may also serve as a binder. A mixture of two or more of the binders may also be utilized.

A mixture of polymerized vinyl acetate and ethyl cellulose that has been ethylated to an extent of 46.5% or more, such as 49%, is particularly desirable as the organic resinous binder in certain applications. When ethyl cellulose is utilized as a binder for the refractory material, or in combination with one of the other binders, the coating layer is more resistant to moisture than coating compositions in which it is not present. On the other hand, the polymerized vinyl acetate retains its binding properties to a greater degree at temperatures ranging from 425° to 540° C. than ethyl cellulose. When a coating composition containing polymerized vinyl acetate is applied to a frozen mercury pattern to form a layer or film, the applied layer or film is also more adherent to the frozen mercury pattern and is more coherent to a previously applied layer or film of the same or similar compositions than layers or films which contain ethyl cellulose as the organic resinous binder. A coating composition containing both ethyl cellulose and polymerized vinyl acetate possesses the advantageous properties of both binders, and has been found highly satisfactory.

In utilizing—as an organic resinous binder—a mixture of polymerized vinyl acetate and ethyl cellulose that has been ethylated to an extent of at least 46.5%, their relative proportions may be varied. For instance, an organic resinous binder consisting principally of polymerized vinyl acetate and containing a small but substantial amount of the ethyl cellulose will have more desirable properties when utilized in the coating composition than polymerized vinyl acetate alone, and likewise, an organic resinous binder consisting principally of ethyl cellulose and a small but substantial amount of polymerized vinyl acetate will have more desirable properties when utilized in the coating composition than ethyl cellulose alone. Generally stated, when utilizing a mixture of polymerized vinyl acetate and ethyl cellulose, the organic resinous binder may consist of from approximately three to six parts by weight of polymerized vinyl acetate and one part by weight of ethyl cellulose to from three to six parts by weight of ethyl cellulose and one part by weight of polymerized vinyl acetate. Investment compositions in which the polymerized vinyl acetate and ethyl cellulose are present in equal proportions are satisfactory. It has been found to be desirable, however, and particularly when the investment composition is to be applied to the frozen mercury pattern by dipping the pattern in the composition, to utilize an excess of the polymerized vinyl acetate. For instance, the organic resinous binder may consist of three to six parts by weight of polymerized vinyl acetate to one part by weight of the ethyl cellulose.

The copolymers of acrylonitrile and butadiene when utilized in coating compositions as the organic resinous binder for the refractory material, have greater strength over a temperature ranging from approximately 425° to 450° C. than the other binders mentioned, and, consequently are also particularly adapted to be utilized in combination with ethyl cellulose in proportions ranging from approximately three to six parts by weight of the copolymers and one part by weight of the ethyl cellulose to one part by weight of the copolymers and from three to six parts by weight of the ethyl cellulose.

In the coating compositions for preparing the inner shell layer and also the other supporting shell layer, the amount of the organic resinous binder which is adherent to a frozen mercury pattern and coherent or adherent to previously applied layers or films of the name or a similar composition may vary from approximately .25% to 5% or even somewhat higher up to 7% of the portion of the coating composition that is in the solid state after the liquid carrier vaporizes. Good results are obtained with the amount of the low temperature binder forming from approximately .5% to 2% of that portion of the coating composition which is in the solid state after the liquid carrier vaporizes.

It is also useful to embody in the coating composition a thermosetting resinous material, such as coumarone-indene resin or a phenol-formaldehyde condensation product in its intermediate soluble stage, in an amount ranging from .3% to 3% of the weight of the solid ingredients of the composition. The phenol-formaldehyde condensation product in its intermediate soluble stage is not adherent to a frozen mercury pattern and has no binding properties at or below the freezing temperature of mercury. It does, however, have the property of imparting a smoother surface to the coating strata applied to the frozen mercury pattern. Its presence in the composition, however, is not essential because coating compositions containing any one, or a mixture, of the organic resinous binders previously described, may be applied in the form of a smooth layer or film to a frozen mercury pattern and the compositions containing such organic resinous binder will not only adhere to and cause the refractory material and the raised temperature binder to adhere to the frozen mercury pattern, but they will also bind the refractory material and the raised temperature binder together at temperatuers ranging from below —40° C. up to the temperature at which the raised temperature binder becomes effective as a binder for the refractory material.

The shell-forming slurry-like coating composition to be applied to the frozen mercury pattern also contains a suitable liquid carrier which holds the refractory particles and the raised temperature binder in a dispersed state and also holds the organic resinous binder in a dispersed or dissolved state. It is desirable to use a carrier which is a solvent for the organic resinous binder and which at least partially dissolves the phenol-formaldehyde condensation product if it is present in the composition. The liquid carrier should be present in an amount sufficient to provide with the normally solid ingredients of the composition a slurry of sufficiently low viscosity to enable the composition to be applied to the frozen mercury pattern in the form of a stratum or film by dipping the frozen mercury pattern in the slurry although it is within the scope of the present invention to apply the composition in any suitable way, such as by pouring, brushing, pumping or spraying the composition on the frozen mercury pattern.

A suitable liquid carrier is one which is liquid when applied to the frozen mercury pattern below its freezing temperatures, such as —40° C. and has a boiling point at normal temperatures, such as at approximately 15° to 25° C. at atmospheric pressure, and particularly an organic liquid that is a solvent for the organic resinous binder and which has a boiling point between about —20° and 0° C. at atmospheric pressure. Liquefied monochlorodifluoromethane (Freon 22) or dichlorodifluoromethane (Freon 12), liquefied methyl chloride, or a mixture of the same has proven satisfactory. Polymerized n-butylmethacrylate, polymerized isobutylmethacrylate, and polymerized vinyl acetate are also soluble in liquefied dimethyl ether which may be utilized as a carrier when one of those binders is utilized, either alone or mixed with one of the other carriers or solvents. All of the organic resinous binders given above are also soluble in dichloromonofluoromethane (Freon 21) while trichloromonofluoromethane (Freon 113) is a solvent for ethyl cellulose. Dichloromonofluoromethane and trichloromonofluoromethane, however, boil at temperatures considerably above −18° C. and consequently, the drying of a layer or film of the coating composition on a frozen mercury pattern will be slower when one of those carriers is utilized than carriers having a lower boiling point. Similar conditions apply to other liquid carriers of a similar type, such as monochloropentafluoroethane (Freon 115) octafluoro-cyclobutane (Freon C–118), dichlorotetrafluoroethane (Freon 114) and the like. When such higher boiling carriers are utilized, it is desirable, therefore, to mix one or both of them with a carrier having a lower boiling point, such as liquefied monochlorodifluoromethane.

The desired liquid carrier for the solid ingredients of the composition may also be formed of a mixture of other liquids or liquefied gases and particularly when the organic resinous binder which is utilized is soluble in such mixture of liquids. For instance, polymerized isobutyl-methacrylate is soluble in a mixture consisting of 90% dichlorodifluoromethane (Freon 12) and 10% dichloromonofluoromethane (Freon 21) and ethyl cellulose and polymerized vinyl acetate are soluble in dichlorodifluoromethane (Freon 12) when mixed with 30% or more of liquefied dichloromonofluoromethane (Freon 21).

As the carrier, liquefied monochlorodifluoromethane has proven to be especially suitable for use in coating compositions which are to be applied to frozen mercury patterns because it is a gas at normal temperature, is in the liquid state at the temperature of the frozen mercury pattern, and volatizes in a short period of time at temperatures below 40° C.

A sufficient amount of the liquid carrier should be present to hold dispersed or dissolved the organic resinous binder as well as other coating ingredients, and to provide, together with the solid composition ingredients, a slurry of the desired viscosity, which viscosity may be varied over a considerable range in accordance with the specific patterns. For coating intricate frozen mercury patterns, the viscosity of the slurry for preparing the inner shell layer should be about 100 to 150 centipoises at −60° C. so that the slurry when applied will penetrate into indentations and small openings and will form a thin film or stratum on thin blades or fins arranged in close proximity to each other. For less intricate patterns, the viscosity of the slurry may be higher, up to about 250 centipoises at −60° C. The slurry for the outer backing shell layer may have a still higher viscosity, such as in the range of from 400 to 1600 centiposes at −60° C.

The raised temperature binder for the refractory particles is so chosen as to become effective as a binder for the refractory particles at or above normal temperatures and which, after becoming effective, binds the refractory particles together at the casting temperature of substantially all metals and alloys, such as metals or alloys having a fusion point of approximately 1800° C. or higher, as well as at low and intermediate temperatures from below −40° C. Inorganic binders which become effective at temperatures ranging from 150° to 600° C. have proven especially suitable and particularly those having an alkali metal or an ammonium base.

Various compounds or mixtures of compounds have proven suitable as raised temperature binder for shell-forming coating compositions of the invention. Among suitable raised temperature binders are the alkali metal fluorides, such as sodium, potassium or lithium fluoride or compounds containing an alkali metal fluoride such as cryolite, barium nitrite, boron nitride, phosphorous pentoxide, berrylium fluoride, berrylium borate or tetraborate; also the alkali metal silicates which contain water of crystallization such as sodium or potassium metasilicate. Suitable raised temperature binders are also the primary, secondary or tertiary ammonium phosphates having a particle size ranging from −150 mesh to −325 mesh or less, an alkali metal phosphate or a mixture of an alkali metal and an ammonium phosphate, such as microcosmic salt; or a mixture of two or more of the foregoing compounds.

Among suitable raised temperature binders are also alkali metal borates or alkali metal tetraborates, such as a borate or tetraborate of sodium, potassium, or lithium, or compounds which react on heating to form an alkali metal borate or an alkali metal tetraborate, or a mixture of an alkali metal borate or an alkali metal fluoride. For instance, a mixture of sodium or lithium fluoride and a boron compound, such as boric acid or boric oxide, is satisfactory. The amount of boric acid or boric oxide which is added to a coating composition containing an alkali metal fluoride to provide a raised temperature binder for the refractory material may range from more incidental impurities, or minute proportion, up to an amount sufficient to react with a major part or all of the alkali metal fluoride. However, at present, best results are obtained with an excess of alkali metal fluorides as part of the raised temperature binder. In general, when sodium fluoride is utilized, the boric acid may be present in amounts up to approximately one part acid in some cases up to three parts by weight of the sodium fluoride. When a shell mold containing sodium fluoride and boric acid or boric oxide is heated to approximately a red heat, the sodium fluoride and boron compound react to form molten borax which envelops the grains of the refractory material to provide a binder therefor. When utilizing an alkali metal fluoride and boric acid or boric oxide, it is desirable to mix the compounds together in such proportions that some of the alkali metal fluoride will be present after the reaction takes place. For instance, approximately three to six parts or more by weight of the sodium fluoride may be utilized to one part by weight of the boric acid, in which case the binder for the refractory material which becomes effective at raised temperatures consists of a mixture of sodium borate and the reaction product of the sodium fluoride and the refractory material.

When a mixture of an alkali metal fluoride with an alkali metal borate or an alkali metal tetraborate is utilized as raised temperature binder of the composition, these ingredients may be present in the wide range of proportions, such as from approximately 99% of the alkali metal fluoride with 1% of the alkali metal borate or alkali metal tetraborate—to 1% of the alkali metal fluoride with 99% of the alkali metal borate or alkali metal tetraborate. The addition of an alkali metal borate or an alkali metal tetraborate to an alkali metal fluoride as a raised temperature binder ingredient increases the hardness of the cavity surface of the mold. The hardness of the mold cavity may thus be regulated by varying the proportion of the alkali metal borate or alkali metal tetraborate in the mixture. On the other hand, the addition of an alkali metal fluoride to an alkali metal borate or an alkali metal tetraborate as a raised temperature binder ingredient increases the strength of the mold at high temperatures. A mixture of an alkali metal borate or an alkali metal tetraborate and an alkali metal fluoride is therefore particularly advantageous in molds requiring a hard cavity surface and high strength at high temperatures.

An ammonium phosphater of small particle size is of advantage as a raised temperature binder ingredient when it is utilized in combination with an organic resinous low-temperature binder that is effective in binding the refractory particles together at low temperature, because the ammonium phosphate decomposes at temperatures ranging from 150° to 430° C. to form a phosphoric acid which reacts with the refractory particles before the low temperature binder is substantially modified into a vapor or the like, thus giving the mold good strength throughout the entire baking or hardening range.

The coating composition should contain sufficient raised temperature binder to bind the refractory particles together after the shell mold has been heated to a temperature sufficient to modify the organic resinous binder and also during the casting of molten metal into the shell mold. In general, depending upon the particular binder chosen, amounts of raised temperature binder varying from approximately .1% to 5% of the total amount of solids in the coating composition (after the carrier vaporizes) have given satisfactory results. In compositions for preparing both the inner shell layer and also the outer shell layer, the amount of the raised temperature binder may be .5% to 5% and even somewhat higher up to 7%, by weight, of the solids in the composition (after the carrier evaporates). When primary ammonium phosphate is utilized as the raised temperature binder, approximately 2% to 4% of the binder, based on the total amount of solids in the coating composition has been found to be especially suitable.

The coating composition for producing the outer backing shell layer of a shell mold composed of two or more shell layers, such as backing shell layer 29 (Fig. 4) or backing shell layer 38 (Fig. 8) or backing shell layer 48 (Fig. 10), may be formed of essentially the same ingredients as utilized to form the inner shell layer. However, the refractory particles of the coating composition for the backing-shell layer are chosen to be partly of coarse particle size and partly of fine particle size. The fine refractory particles of the composition may be of the same fine particle material as used for forming the inner shell layer. As the coarse refractory particles, any suitable refractory particle material capable of resisting high temperatures may be used, such as prefired firebrick particles, prefired silica sand, zirconia, micaceous material such as vermiculite, an aluminum silicate, such as sillimanite or mullite, or a mixture of two or more of such refractory particle materials. The size of the coarse particles may vary over a wide range, for instance, they may have an average particle size of —12 mesh and +60 mesh.

It is within the broad aspects of the invention to form thin shell molds of the invention with a single shell-forming coating composition as by applying superposed coating strata thereof in any desired manner, such as by dipping, spraying, brushing or pouring, to form a self-supporting thin shell mold of the required thickness. It is also within the broad aspects of the invention to form such thin self-supporting shell mold with inner and outer shell layers produced out of different coating compositions, both of which contain the same fine grade of refractory particle material. However, in actual practice, it has been found desirable to form thin self-supporting shell molds of the invention having an inner shell layer produced with a coating composition containing essentially fine refractory particles and an outer backing shell layer produced with a coating composition containing both coarse and fine refractory particles. By using for the outer shell layer a coating composition of the invention containing coarse refractory particles, the outer shell layer may be built up more quickly, out of less coating strata than would be the case if formed of coating compositions containing the fine grade of refractory particles only. In addition, the coarse refractory particles give the outer backing shell layer greater strength in resisting lateral movement of the relatively thin walls of the shell mold when molten metal of high temperature is cast into the mold cavity. A shell mold having such coarse-particle backing layer exhibits also greater porosity or permeability in permitting the escape of gases evolved in the mold cavity when hot metal is cast into it. When coating composition for forming the backing shell layer are made up with the coarse refractory particles only, they tend to settle from the coating slurry composition, and it is more difficult to apply a uniform coating stratum out of such composition by the usual dipping or spraying processes. This difficulty is avoided by preparing the backing-layer coating composition with an addition of fine-grade refractory particles to the coarse-grade particles in an amount sufficient to substantially hold the coarse refractory particles in suspension within the composition slurry. Good results are obtained with backing-layer slurry compositions wherein the proportion of the fine refractory particles to the coarse refractory particles vary over the range between about 3 to 2 and 1 to 1. In general, depending on the character and the shape of the article to be cast and the size thereof, the proportion of the fine to the coarse particles may be varied over the range between 3 to 2 and 2 to 3.

The following are specific examples of shell-forming coating compositions suitable for preparing the inner shell layer of thin shell molds of the invention of the type shown in Figs. 2 to 10.

Example A-1

| | Grams |
|---|---|
| Liquefied monochlorodifluoromethane (Freon 22) | 10,500.0 |
| Polymerized vinyl acetate having a viscosity of 700 to 900 centipoises at 20° C. with molar solution in benzene | 141.8 |
| Ethyl cellulose that has been ethylated to an extent of 46.5% to 48.5% and having a viscosity of 20 centipoises when a 5% solution thereof is dissolved in a mixture of 80% toluene and 20% ethanol | 47.3 |
| Phenol-formaldehyde condensation product condensed to its intermediate soluble stage | 94.5 |
| Boric acid | 46.2 |
| Sodium fluoride | 140.7 |
| Zirconium silicate, —325 mesh particle size | 18,429.5 |

Example A-2

| | |
|---|---|
| Liquefied monochlorodifluoromethane (Freon 22) | 21,000 |
| Polymerized vinyl acetate having a viscosity of 700 to 900 centipoises at 20° C. with molar solution in benzene | 284 |
| Ethyl cellulose that has been ethylated to an extent of 46.5% to 48.5% and having a viscosity of 20 centipoises when a 5% solution thereof is dissolved in a mixture of 80% toluene and 20% ethanol | 94 |
| Phenol-formaldehyde condensation product condensed to its intermediate soluble stage | 189 |
| Primary ammonium phosphate, —325 mesh particle size | 1,325 |
| Zirconium silicate, —325 mesh particle size | 35,925 |

Example A-3

| | |
|---|---|
| Liquefied monochlorodifluoromethane (Freon 22) | 800 |
| Copolymer of 40% acrylonitrile and 60% butadiene | 13.5 |
| Boric acid | 2.4 |
| Sodium fluoride | 7.3 |
| Zirconium silicate of —325 mesh particle size | 1,326.8 |

Example A-4

| | |
|---|---|
| Liquefied monochlorodifluoromethane (Freon 22) | 1,950.0 |
| Ethyl cellulose, ethylated to 46.5% and a 5% solution of which in 80% toluene and 20% ethyl alcohol has a viscosity of 10 centipoises | 27.0 |
| Phenol-formaldehyde condensation product condensed to its intermediate soluble stage | 13.5 |
| Boric acid | 6.0 |
| Sodium fluoride | 18.3 |
| Zirconium silicate, —325 mesh particle size | 2,635.2 |

Example A-5

| | Grams |
|---|---|
| Liquefied monochlorodifluoromethane (Freon 22) | 1,500.0 |
| High viscosity polymerized isobutylmethacrylate | 27.0 |
| Boric acid | 5.84 |
| Sodium fluoride | 17.5 |
| Zirconium silicate, —325 mesh particle size | 2,639.7 |

Example A-6

| | |
|---|---|
| Liquefied monochlorodifluoromethane (Freon 22) | 1,950.0 |
| Polymerized vinyl acetate having a viscosity of 700 to 900 centipoises at 20° C. with molar solution in benzene | 27.0 |
| Phenol-formaldehyde condensation product condensed to intermediate soluble stage | 13.5 |
| Borax, anhydrous | 43.5 |
| Zirconium silicate, —325 mesh particle size | 2,615.7 |

Example A-7

| | |
|---|---|
| Liquefied monochlorodifluoromethane (Freon 22) | 18,500.0 |
| Polymerized vinyl acetate having a viscosity of 700 to 900 centipoises at 20° C. with molar solution in benzene | 189.0 |
| Phenol-formaldehyde condensation product condensed to intermediate soluble stage | 84.5 |
| Primary ammonium phosphate, —325 mesh particle size | 861.5 |
| Zirconium silicate, —325 mesh particle size | 17,955.0 |

Example A-8

| | |
|---|---|
| Liquefied monochlorodifluoromethane (Freon 22) | 1,800.0 |
| Polymerized vinyl acetate having a viscosity of 900 centipoises at 20° C. with molar solution in benzene | 20.25 |
| Ethyl cellulose, ethylated to from 46.5% to 48.5% and a 5% solution of which in 80% toluene and 20% ethyl alcohol has a viscosity of 20 centipoises | 6.75 |
| Phenol-formaldehyde condensation product condensed to its intermediate soluble stage | 13.5 |
| Primary ammonium phosphate —325 mesh particle size | 81.0 |
| Zirconium silicate, —325 mesh particle size | 2,578.5 |

Example A-9

| | |
|---|---|
| Liquefied monochlorodifluoromethane (Freon 22) | 10,500.0 |
| Polymerized vinyl acetate having a viscosity of 700 to 900 centipoises at 20° C. with molar solution in benzene | 81.0 |
| Phenol-formaldehyde condensation product condensed to its intermediate soluble stage | 94.5 |
| Sodium fluoride | 54.8 |
| Zirconium silicate, —325 mesh particle size | 7,923.7 |

Example A-10

| | |
|---|---|
| Liquefied dichlorodifluoromethane (Freon 12) | 765.0 |
| Liquefied dichloromonofluoromethane (Freon 21) | 85.0 |
| Polyisobutyl methacrylate | 13.5 |
| Phenol-formaldehyde condensation product condensed to intermediate soluble stage | 6.7 |
| Boric acid | 1.5 |
| Sodium fluoride | 4.6 |
| Zirconium, —325 mesh particle size | 1,323.6 |

Example A-11

| | Grams |
|---|---|
| Liquefied methyl chloride | 700.0 |
| Polyisobutyl methacrylate | 13.5 |
| Boric acid | 3.0 |
| Sodium fluoride | 9.1 |
| Zirconium silicate, —325 mesh particle size | 1,324.4 |

The following are examples of coating compositions that may be utilized for preparing the outer shell layer of shell molds of the type shown in Figs. 2, 4, Figs. 6 to 8 and Figs. 9 to 11.

Example B-1

| | |
|---|---|
| Liquefied monochlorodifluoromethane (Freon 22) | 18,000 |
| Polymerized vinyl acetate having a viscosity of 900 centipoises at 20° C. with molar solution in benzene | 400 |
| Ethyl cellulose, ethylated from 46.5% to 48.5% and a 5% solution of which in 80% toluene and 20% ethyl alcohol has a viscosity of 20 centipoises | 132 |
| Primary ammonium phosphate, —325 mesh particle size | 500 |
| Phenol-formaldehyde condensation product condensed to its intermediate soluble stage | 148 |
| Aluminum silicate (mullite) of —14 mesh, +25 mesh particle size | 14,568 |
| Zirconium silicate, —325 mesh particle size | 23,952 |

Example B-2

| | |
|---|---|
| Liquefied monochlorodifluoromethane (Freon 22) | 18,000 |
| Polymerized vinyl acetate having a viscosity of 700 to 900 centipoises at 20° C. with molar solution in benzene | 400 |
| Ethyl cellulose ethylated to an extent of 46.5% to 48.5% and having a viscosity of 20 centipoises when a 5% solution thereof is dissolved in a mixture of 80% toluene and 20% ethanol | 132 |
| Phenol-formaldehyde condensation product condensed to its intermediate soluble stage | 148 |
| Sodium fluoride | 54 |
| Boric acid | 18 |
| Aluminum silicate (mullite), —14 mesh, +25 mesh particle size | 14,568 |
| Zirconium silicate, —325 mesh particle size | 23,952 |

Example B-3

| | |
|---|---|
| Liquefied monochlorodifluoromethane (Freon 22) | 3,660.0 |
| Copolymers of 60% butadiene and 40% acrylonitrile | 59.5 |
| Boric acid | 2.7 |
| Sodium fluoride | 8.1 |
| Zirconium silicate, —325 mesh particle size | 2,362.5 |
| Firebrick —12 mesh, +40 mesh particle size | 3,528.8 |

Example B-4

| | |
|---|---|
| Liquefied monochlorodifluoromethane (Freon 22) | 3,600.0 |
| Polymerized isobutylmethacrylate, high viscosity | 59.5 |
| Boric acid | 2.7 |
| Sodium fluoride | 8.1 |
| Zirconium silicate, —325 mesh particle size | 2,653.5 |
| Firebrick —12 mesh, +40 mesh particle size | 3,528.8 |

Example B-5

| | Grams |
|---|---|
| Liquefied monochlorodifluoromethane (Freon 22) | 6,630.0 |
| Polymerized isobutylmethacrylate, high viscosity | 148.8 |
| Boric acid | 6.7 |
| Zirconium silicate, of —325 mesh particle size | 5,881.3 |
| Firebrick —12 mesh, +40 mesh particle size | 2,822.0 |

Example B-6

| | Grams |
|---|---|
| Liquefied monochlorodifluoromethane (Freon 22) | 28,200.0 |
| Polymerized vinyl acetate having a viscosity of 700 to 900 centipoises at 20° C. with molar solution in benzene | 798.0 |
| Primary ammonium phosphate, —325 mesh particle size | 1,200.0 |
| Zirconium silicate, —14 mesh, +35 mesh particle size | 35,928.0 |
| Mullite (aluminum silicate), —14 mesh, +35 mesh, particle size | 21,852.0 |

Example B-7

| | Grams |
|---|---|
| Liquefied monochlorodifluoromethane (Freon 22) | 18,800.0 |
| Polymerized vinyl acetate having a viscosity of 700 to 900 centipoises at 20° C. with molar solution in benzene | 400.0 |
| Ethyl cellulose ethylated to an extent of 46.5% to 48.5% and having a viscosity of 20 centipoises when a 5% solution thereof is dissolved in a mixture of 80% toluene and 20% ethanol | 132.0 |
| Phenol - formaldehyde condensation product condensed to its soluble intermediate stage | 148.0 |
| Primary ammonium phosphate, —325 mesh particle size | 800.0 |
| Zirconium silicate, —325 mesh particle size | 23,952.0 |
| Mullite (aluminum silicate) —14 mesh, +35 mesh particle size | 14,568.0 |

Example B-8

| | Grams |
|---|---|
| Liquefied monochlorodifluoromethane (Freon 22) | 8,900.0 |
| Polymerized vinyl acetate having a viscosity of 900 centipoises at 20° C. with molar solution in benzene | 225.0 |
| Ethyl cellulose, ethylated to from 46.5% to 48.5% and a 5% solution of which in 80% toluene and 20% ethyl alcohol has a viscosity of 20 centipoises | 75.0 |
| Boric acid | 8.9 |
| Sodium fluoride | 27.3 |
| Zirconium silicate, —325 mesh particle size | 7,865.4 |
| Aluminum silicate (mullite) —14 mesh, +35 mesh particle size | 11,798.3 |

In general, the shell-forming coating compositions given above in Examples A-1 to A-11 are suitable for producing the outer backing shell layer by substituting for the fine refractory particle ingredients thereof, a mixture of coarse refractory particles with fine refractory particles porportioned in the manner given above for the refractory particle ingredients of the Examples B-1 to B-7. Furthermore, the amount of the liquid carrier, such as liquefied monochlorofluoromethane, present in the examples of the coating compositions given above may be increased (or decreased) for decreasing (or increasing) the viscosity of the coating composition in accordance with the particular requirements and the particular shape of the frozen mercury pattern of the cast article that is to be produced with a thin-walled shell mold of the invention.

Any of the shell forming coating compositions given in Examples A-1 through A-11 may be utilized for forming the inner shell layer of a thin-wall shell mold of the invention and any of the compositions given in Examples B-1 through B-7 may be utilized in preparing the outer backing shell layer of such shell mold. However, in producing such two-layer thin shell molds of the invention it is of particular advantage to form the outer backing shell layer with a raised temperature binder which is an ammonium phosphate and to form the inner shell layer with a raised temperature binder which is an alkali metal fluoride, an alkali metal borate, an alkali metal tetraborate, or a mixture of an alkali metal fluoride and an alkali metal borate or tetraborate, or compounds which react to form such binder compounds or mixtures.

Such combination of different high temperature binder ingredients in the inner shell layer and the outer backing shell layer of such shell mold is of advantage because a reaction occurs between the alkali metal compound or compounds on the exterior surface of the inner shell layer with the ammonium phosphate at the surface interior of the outer backing shell layer which reaction results in the formation of a metal phosphate at the junction region between the inner and outer shell layers. The metal phosphate junction region so formed between the inner shell layer and the outer backing shell layer constitutes only a relatively weak bond between them, which is capable of yielding and permits the inner shell layer to slightly contract or expand; for instance, when metal having a very high melting point is cast into the mold cavity or when hot molten metal cast into the mold cavity cools and contracts about cores, or like wall portions of the mold.

In producing shell molds of the invention, it is also of advantage to use shell-forming coating compositions of the type given in the foregoing examples which contain the combination of polymerized vinyl acetate and ethyl cellulose as the organic resinous material, either with or without a thermosetting resin ingredient, such as phenolformaldehyde condensation product. When a phenol-formaldehyde condensation product is utilized in the shell-forming coating composition, it does not become effective as a binder for the refractory particles until it is converted by the applied heat into its infusible insoluble state, thus supplementing the organic resinous binder ingredients in binding the refractory particles together at temperatures in the range from about 150° C. to about 530° C., and becoming modified with them into vapors at temperatures, thereby giving the thin shell mold its desired great porosity.

In preparing the inner shell layer of a shell mold consisting of one or more shell layers, it is also desirable to utilize as the raised temperature binder in the inner shell layer a compound or a mixture of compounds having a metal base, such as a metal fluoride, a metal borate, or a metal tetraborate, or a mixture of a metal fluoride and a metal borate or a metal tetraborate because when such compounds or mixtures are utilized as the raised temperature binder, the hardness of the inner surface of the mold cavity may be controlled by varying the percentage of the raised temperature binder that is utilized. Compounds containing an alkali metal as the base are particularly suitable, such as sodium fluoride, sodium borate, or sodium tetraborate, or a mixture of sodium fluoride and sodium borate or sodium tetraborate, or compounds which react to provide sodium borate or sodium tetraborate or a mixture of sodium fluoride and sodium borate or sodium tetraborate.

It should be noted that boron and fluorine compounds having a metal base, such as an alkali metal base, do not become effective as a binder for the refractory particles until the shell mold has been heated to a temperature of from approximately 450° to 600° C. Consequently, when such binders are utilized in both the inner and outer shell layers, a considerable portion of the organic resinous binder will have become modified into a vapor before the raised temperature binder becomes effective as a binder for the refractory particles and as a result the shell mold may bend or sag slightly during the baking operation. However, when an ammonium phosphate of comparatively small particle size is utilized as the raised temperature binder ingredient for the outer shell layer, however, the ammonium phosphate decomposes to form phosphoric acid at a comparatively low temperature, such as at temperatures of approximately 300° to 400° C. and consequently the shell mold will retain its strength throughout the entire baking range.

When casting molten ferrous metals, or other metals which tend to react with or absorb phosphorous from the mold material, it is of advantage to form the inner shell layer with a raised temperature binder formed of a metal fluoride, a metal borate or a metal tetraborate, or a mixture thereof, such as an alkali metal fluoride, an alkali metal borate or an alkali metal tetraborate, and particularly sodium fluoride, sodium borate, sodium tetraborate, or mixtures thereof, or compounds which react to form sodium borate or sodium tetraborate, or a mixture of sodium fluoride and sodium borate or sodium tetraborate. Thus if the inner shell layer contains an ammonium phosphate as the raised temperature binder, the ferrous metal has the tendency to absorb phosphorous from the mold. On the other hand, if the inner shell layer contains a metal borate or a metal tetraborate or a metal fluoride, or a mixture of a metal fluoride and a metal borate or a metal tetraborate, and particularly a compound or mixture of the type mentioned having a sodium base, the inner shell layer prevents the molten ferrous or like metal being cast from absorbing phosphorous from the outer shell layer while the ammonium phosphate in the outer backing shell layer makes it possible to prevent sagging of the shell mold when, in processing, it is heated to a raised temperature at which the raised temperature binder in the shell mold becomes effective as a binder for the refractory particles and the organic resinous binder becomes modified to render the shell mold porous.

In preparing substantially thin castings in which the thickness of the shell mold is approximately 1/32 of an inch, an inner shell layer having a thickness of 1/64 of an inch will prevent the ferrous metal from absorbing any substantial amount of phosphorous from the outer shell layer. When thick castings are to be formed, the thickness of the inner shell layer may range from 1/32 to 1/8 of an inch in cases where the overall thickness of the shell mold varies up to 1/4 of an inch in thickness.

In forming shell molds in which the raised temperature binder is an alkali metal fluoride, an alkali metal borate or tetraborate, or a mixture of an alkali metal fluoride and an alkali metal borate or tetraborate, or compounds which react to form an alkali metal borate or tetraborate, or a mixture of an alkali metal fluoride and an alkali metal borate or tetraborate, the amount of the raised temperature binder may vary from approximately .2% to 2% based on the total amount of dried shell layer body which has been formed after the carrier volatilizes, and the amount of ammonium phosphate in the outer backing layer may vary from approximately 2% to 5% of the dried body thereof. A satisfactory shell mold is obtained when the composition disclosed in Example A-1 is utilized in preparing the inner shell layer and the composition disclosed in Example B-1 is utilized in providing the outer shell layer. In forming a shell two-layer mold of the invention wherein the composition of the inner layer is different from the composition in the outer layer, it is not essential, though desirable, that the refractory particles in the outer shell layer shell be composed partly of coarse refractory particles. For instance, in preparing a shell mold of the invention, the composition of Example A-1 may be utilized in forming the inner shell layer and the composition of Example A-2 may be utilized in forming the outer shell layer.

In preparing a slurry of the shell forming compositions for producing shell molds of the invention, the solid ingredients of the composition are precooled to a temperature below the freezing temperature of the frozen mercury pattern and then thoroughly mixed with the liquefied monochlorodifluoromethane, which is also maintained at such low temperature.

To facilitate the mixture of the raised temperature binder with the refractory particles, a premixture of the raised temperature binder with a portion of the refractory material is prepared prior to mixing the solid ingredients with the liquefied carrier or solvent, such as monochlorodifluoromethane. For instance, in preparing the composition disclosed in Example A-1, the sodium fluoride and boric acid are premixed with a portion of the zirconium silicate in the ratio of nine parts of the zirconium silicate to approximately one part of the combined weight of the sodium fluoride and boric acid giving a premix consisting of approximately 3,364 grams of the zirconium silicate, 282 grams of the sodium fluoride, and 92 grams of the boric acid and this premixture may be suitably ground as in a ball or pebble mill, for approximately six hours. This premixture, and the other solid ingredients of the composition, are then precooled to a temperature below the freezing temperature of the frozen mercury pattern, and added to the liquefied monochlorodifluoromethane which is also maintained at such low temperature.

In a like manner, the ammonium phosphates of Examples A-2 and B-1 may be mixed with equal proportions of the zirconium silicate and the premixture thus formed suspended in a liquid in which the ammonium phosphate is insoluble, such as carbon tetrachloride. The suspension, thus formed, is then ground in a suitable mill, such as a ball or pebble mill for approximately nine to ten hours. After evaporation of the carbon tetrachloride, the premixture together with the remainder of the solid ingredients is precooled to a temperature below the freezing temperature of the frozen mercury pattern and then thoroughly mixed with the monochlorodifluoromethane which is likewise maintained at such low temperatures.

The following are examples of coating compositions for preparing the buffer layer of shell molds of the type shown at 47 in Fig. 11. These compositions may also be utilized for preparing a shell mold layer or shell mold of the invention in which a raised temperature binder is not present.

*Example C-1*

| | Grams |
|---|---|
| Liquefied monochlorodifluoromethane (Freon 22) | 22,000.0 |
| Polymerized vinyl acetate having a viscosity of 700 to 900 centipoises at 20° C. with molar solution in benzene | 378.0 |
| Phenol-formaldehyde condensation product condensed to its intermediate stage | 189.0 |
| Zirconium silicate, —325 mesh particle size | 37,233.0 |

*Example C-2*

| | Grams |
|---|---|
| Liquefied monochlorodifluoromethane (Freon 22) | 3,200.0 |
| Copolymers of 40% acrylonitrile and 40% butadiene | 54.0 |
| Zirconium silicate, —325 mesh particle size | 5,345.0 |

*Example C-3*

| | Grams |
|---|---|
| Liquefied monochlorodifluoromethane (Freon 22) | 3,000.0 |
| Polymerized isobutylmethacrylate, high viscosity | 120.0 |
| Zirconium silicate, —325 mesh particle size | 3,900.0 |

Example C-4

| | Grams |
|---|---|
| Liquefied monochlorodifluoromethane (Freon 22) | 3,000.0 |
| Polymerized vinyl acetate having a viscosity of 700–900 centipoises at 20° C. with molar solution in benzene | 5,346.0 |

Example C-5

| | Grams |
|---|---|
| Liquefied monochlorodifluoromethane (Freon 22) | 6,000.0 |
| Polymerized vinyl acetate having a viscosity of 900 centipoises at 20° C. with molar solution in benzene | 20.5 |
| Ethyl cellulose, ethylated to from 46.5% to 48.5% and a 5% solution of which in 80% toluene and 20% ethyl alcohol has a viscosity of 20 centipoises | |
| Zirconium silicate, —325 mesh particle size | 8,019.0 |

Example C-6

| | Grams |
|---|---|
| Liquefied monochlorodifluoromethane | 5,800.0 |
| Polmerized vinyl acetate having a viscosity of 700 to 900 centipoises at 20° C. with molar solution in benzene | 81.0 |
| Phenol-formaldehyde condensed to its intermediate soluble stage | 40.5 |
| Zirconium silicate, —325 mesh particle size | 7,978.5 |

In general, the shell-forming coating compositions, given above in Examples A-1 to A-11, which are suitable for producing the inner shell layer may be modified to serve for producing the buffer layer, of the type shown at 47 in Fig. 11 and set forth in Examples C-1 to C-6 above, by omitting the high temperature binder from the corresponding coating composition for the inner shell layer.

Shell molds of the invention which contain the raised temperature binder have proven very effective for coating metals of high melting temperatures, such as cobalt-chromium-nickel alloys (Vitalium) or stainless steel alloys, into articles such as gas turbine buckets, gas turbine vanes or other articles.

In order to render the raised temperature binder effective the shell mold has to be subjected to a baking or firing treatment at elevated temperatures, at which the raised temperature binder becomes effective in binding the refractory particles into a self-supporting shell, and at which the low temperature resinous binder is fully, or at least partially modified into a vapor and driven off to render the mold porous.

Baking temperatures in the range of about 530° C. to 1200° C. give good results. At such baking temperatures, the low temperature organic resinous binder that is adherent to a frozen mercury pattern is modified to provide a vapor which exudes or is driven off through the mold walls thereby rendering the shell mold porous while the raised temperature binder becomes effective in binding the refractory particles together. For instance, when sodium fluoride and boric acid are utilized as the raised temperature binder of the inner shell layer and primary ammonium phosphate is utilized as the raised temperature binder of the outer backing shell layer, the sodium fluoride reacts with the boric acid at raised temperatures to form sodium tetraborate which envelopes the refractory particles and any excess sodium fluoride that is present reacts with the refractory particles in the inner layer to prove an additional binding action, and the ammonium phosphate in the outer shell layer is decomposed at raised temperatures to form phosphoric acid which reacts with the refractory particles in the outer layer. The ammonium phosphate at the interior surface of the outer shell layer also reacts with the sodium fluoride at the exterior surface of the inner shell layer to form sodium phosphate. The sodium phosphate so formed at the junction region between the inner and outer shell layers is a relatively weak binder and thus provides a weak junction region which permits the inner shell layer to yield when hot metal is cast into the cavity mold or when the cooling metal cast into the mold cavity contracts about cores or other inserts of the shell mold. In a similar way, when a shell mold is impregnated with a binder that becomes effective at raised temperatures, the heating or firing of the mold also decomposes or vaporizes the organic resinous binder and causes the raised temperature binder to become effective as a binder for the refractory particles.

After the shell molds of the invention from which the mercury has been removed, are fired with the raised temperature binder present, the metal may be cast therein by any desirable method, such as by static or centrifugal casting, or the molten metal may be cast in the shell mold under pressure or under vacuum. Thus, a shell mold such as shown at 21 in Fig. 4, may be suspended in a suitable vessel, such as in flask 24, of Fig. 5, and supported therein by any suitable loose-particle refractory material such as loose sand which is placed or blown around the shell mold. When the shell mold is intricate and it is difficult for the loose refractory material to flow into the fine crevices, the flask 24 is vibrated to assist in packing the loose refractory particles. The hot molten metal is cast into the cavity of the thin-walled shell mold 21 so held suspended within flask 24. Since the shell mold of the invention is thin and porous, it permits gases to pass through walls of the shell mold during casting of the molten metal.

In retrieving castings from the shell molds shown, a large portion of the shell mold may be easily removed from the casting. If the cast metal may be quenched in liquids, such as oil or water, without adversely affecting its physical or metallurgical properties, or if quenching is desirable to improve its metallurgical properties, the casting may be quenched and a considerable portion of the refractory material will fall off during the quenching operation. The remainder of the shell mold may be removed by blasting, such as sand blasting.

As explained hereinabove, shell molds of the invention—in the form of a two-layer shell mold shown in Figs. 2 and 4, and Figs. 7 and 8, or in the form of a single layer shell mold as shown in Fig. 5—may be produced without the raised temperature binder by omitting the raised temperature binder from the shell-forming coating compositions which are applied to the frozen mercury pattern for forming thereon the desired thin-wall shell mold.

In accordance with a phase of the invention, shell molds of the invention which have been prepared without the raised temperature binder in the manner described above—after drying into a self-supporting shell mold and removal of the liquefied mercury from the mold cavity—are combined with a raised temperature binder by impregnating such self-supporting shell mold with a solution of a raised temperature binder which is effective in the same way as the raised temperature binder embodied in the shell-forming coating solutions as explained hereinabove.

In other words, in accordance with the invention, shell molds of the invention, which do not contain a raised temperature binder, are impregnated with a solution containing a raised temperature binder, which—after evaporation, or drying or driving off of the solvent—becomes effective as a binder for the refractory particles of the shell mold at temperatures ranging from above normal temperatures up to the temperature below that of at which the organic resinous binder of the shell mold becomes modified to at least partially lose its binding properties, such as at temperatures in the range from about 150° C. to 600° C., and which added raised temperature binder, after becoming effective, binds the refractory particles together over the temperature range from below normal temperatures up to the high temperatures of molten metal and metal alloys that are cast into the mold cavity.

By way of example, a self-supporting thin-wall two-layer shell mold of the invention, is prepared on a frozen mercury pattern, by first forming the inner shell layer with the composition of Example C–1, and after completing the inner shall layer, the outer shell layer is formed thereover with the composition of Example B–1 from which the ammonium phosphate ingredient has been omitted. The two-layer shell mold so formed on the frozen mercury is then dried until all the carrier or solvent thereof has been driven off while the frozen mercury pattern remains in the mold cavity. Thereafter, the frozen mercury pattern is liquified and removed from the mold cavity and the self-supporting shell mold is then impregnated with a solution containing the raised temperature binder. After impregnation, the solvent is driven off by drying. Thereafter, the shell mold with the raised temperature binder so embodied therein is subjected to the baking treatment in the same way as the hereinbefore described shell molds of the invention formed with shell-forming coating compositions containing the raised temperature binder.

Among raised temperature binder impregnating solutions which may be applied in the manner just described are an aqueous solution of phosphoric acid of a strength varying from 10% to 85% or an aqueous solution of ethyl silicate; also aqueous solutions of sodium silicate, sodium metasilicate and zirconium oxychloride. A small amount of wetting agent, such as about 1% of dioctyl sodium sulfosuccinate may be added to the impregnating solution.

The impregnation of the shell mold in the manner described above may be carried on by immersing the self-supporting shell mold into a bath of the impregnating solution containing the raised temperature binder and maintaining it therein for a sufficient time for the solution to completely penetrate the shell mold. Alternatively, the shell mold may be left immersed in the impregnated solution for a shorter time which permits penetration of the raised temperature binder to certain depth of the shell, thus impregnating only the inner and outer strata or regions of the shell mold with the raised temperature binder, leaving the intermediate interior central stratum of the shell mold free from the raised temperature binder.

The time such shell mold is exposed to the impregnating solution will vary with the thickness of the shell mold, the concentration of the impregnating solution, and the depth of penetration desired, depending upon the particular metals that are to be cast into the shell mold. When a concentrated or saturated solution of the impregnating liquid is utilized and the shell mold is comparatively thin, less than a minute may be required, whereas several minutes may be required when the shell mold is comparatively thick, such as shell molds having a thickness ranging from approximately ¼ to ⅜ of an inch. In general, the concentration of the solution and the time of impregnation should be sufficient to incorporate in the shell mold from approximately .25% to 5% of the raised temperature binder based on the total weight of the mold.

The following examples illustrate raised temperature binder compositions that are satisfactory for impregnation of shell molds composed of a refractory material and a low temperature organic resinous binder that is adherent to a frozen mercury pattern:

Example D–1

| | Grams |
|---|---|
| Sodium metasilicate | 462.0 |
| Dioctyl sodium sulfosuccinate | 10.0 |
| Water | 1000.0 |

Example D–2

| | |
|---|---|
| Phosphoric acid, 85% solution | 50.0 |
| Dioctyl sodium sulfosuccinate | 1.0 |
| Water | 50.0 |

Example D–3

| | Grams |
|---|---|
| Zirconium tetrachloride | 1000.0 |
| Water | 4000.0 |

The zirconium tetrachloride reacts with the water to form soluble zirconium oxychloride ($ZrOCl_2$). A wetting agent may be added.

The solution of the Example D–3 is suitable for embodying a raised temperature binder in shell molds of the invention containing polyvinyl acetate as the low temperature resin binder.

In general, thin-wall shell molds of the invention which do not contain the raised temperature binder—and suitable for impregnation with a raised temperature binder in the manner just described—may be produced on a frozen mercury pattern by using for the inner shell layer the shell-forming compositions of Examples C–1 through C–6 or the compositions of Examples A–1 through A–11 from which the raised temperature binder is omitted. Similarly, the outer backing shell layer may be formed over such inner shell layer by using shell-forming compositions of Examples B–1 through B–7 from which the raised temperature binder is omitted.

Below are additional examples suitable for forming the outer backing shell layer of thin-wall shell molds of the invention which do not contain the raised temperature binder.

Example E–1

| | Grams |
|---|---|
| Liquefied monochlorodifluoromethane | 3,600 |
| Polymerized isobutylmethacrylate, high viscosity | 120 |
| Zirconium silicate, –325 mesh | 2,365 |
| Firebrick particles which pass through a 15 mesh screen and are retained on a 40 mesh screen | 3,513 |

Example E–2

| | |
|---|---|
| Liquefied monochlorodifluoromethane | 6,600.0 |
| Polymerized vinyl acetate having a viscosity of 900 centiposes at 20° centrigrade with molar solution in benzone | 99.3 |
| Ethyl cellulose, ethylated from 46.5% to 48.5% and a 5% solution of which in 80% toluene and 20% ethyl alcohol has a viscosity of 20 centiposes | 99.3 |
| Zirconium silicate, –325 mesh | 5,881.3 |
| Aluminum silicate (Mullite) of size to pass through 14 mesh and be retained on 35 mesh screen | 8,822.0 |

Throughout the specification and claims, all proportions are given by weight, unless otherwise specified.

It will be apparent to all those skilled in the art that the novel principles of the invention disclosed herein in connection with specific exemplifications thereof will suggest various other modifications and applications of the same. It is accordingly desired that in the present invention they shall not be limited to the specific exemplification thereof described herein.

We claim:

1. In a destructible shell mold, a shell-shaped structure having a thickness of at most about ¼ inch and an inner cavity surface of a shape corresponding to an object to be cast, comprising as shell ingredients a predominant amount of refractory particle material and an inner cavity surface forming the mold cavity having refractory material of sufficiently fine particle size to provide a relatively smooth cavity surface, at least the outer shell layer of said shell mold containing as an inorganic raised-temperature binder an ammonium phosphate in the form of small particles –150 mesh in size which constitute from .5% to 5% by weight of the shell ingredients and decomposes at intermediately high temperatures between about 150° and 600° C. to form phosphoric acid and which ammonium phosphate is present in an amount to provide at the decomposition of the ammonium phosphate a sufficient amount of phosphoric acid to react with and bind the refractory particles together at said intermediate temperatures, substantially all other shell layers of said shell mold also containing an inorganic raised temperature binder constituting .5% to 5% of the solid shell ingredients thereof and being effective and sufficient in amount to bind the refractory particles of said shell layers after heating to a raised temperature of at most 1200° C., at least the inner layer of said shell mold being free of phosphorus and phosphorous compounds, and an organic resinous binder for the refractory particles and the inorganic binder ingredients, which organic resinous binder has the property of causing the refractory particles to adhere to a frozen mercury pattern and of binding the refractory particles and the inorganic binder ingredients together into a self-supporting shell mold at temperatures ranging from below the freezing temperature of mercury up to at least the temperature at which the ammonium phosphate particles decompose to form phosphoric acid, said organic resinous binder constituting .25% to 5% by weight of the structure ingredients and being present in an amount sufficient to bind the refractory and ammonium phosphate particles together over said temperature range and being capable of being modified at temperatures above that at which phosphoric acid is formed to provide vapors which exude through the shell mold structure to provide a porous mold.

2. In a destructible shell mold, a shell-shaped structure having a thickness of at most about ¼ inch and an inner cavity surface of a shape corresponding to an object to be cast, comprising as shell ingredients a predominant amount of refractory particle material and an inner cavity surface forming the mold cavity having refractory material of sufficiently fine particle size to provide a relatively smooth cavity surface, an inorganic raised-temperature binder for said refractory particles constituting .5% to 5% of the solid shell ingredients thereof and being effective and sufficient in amount to bind the refractory particles of the shell mold after heating to a raised temperature of at most 1200° C., at least the outer shell layer of said shell mold containing as an inorganic raised-temperature binder an ammonium phosphate in the form of small particles —150 mesh in size which constitutes .5% to 5% by weight of the shell ingredients and decomposes at intermediately high temperatures between about 150° C. and 600° C. to form phosphoric acid and which ammonium phosphate is present in an amount to provide at the decomposition of the ammonium phosphate a sufficient amount of phosphoric acid to react with and bind the refractory particles together at said intermediate temperatures, at least the inner layer of said shell mold being free of phosphorus and phosphorous compounds, and an organic resinous binder for the refractory particles and the inorganic binder ingredients, which organic resinous binder has the property of causing the refractory particles to adhere to a frozen mercury pattern and of binding the refractory particles and the inorganic binder ingredients together into a self-supporting shell mold at temperatures ranging from below the freezing temperature of mercury up to at least the temperature at which the ammonium phosphate particles decompose to form phosphoric acid, said organic resinous binder constituting .25% to 5% by weight of the structure ingredients and being present in an amount sufficient to bind the refractory and ammonium phosphate particles together over said temperature range and being capable of being modified at temperatures above that at which phosphoric acid is formed to provide vapors which exude through the shell mold structure to provide a porous mold, said inner shell structure containing as inorganic raised-temperature binder for the refractory particles a binder substance selected from the group consisting of a metal fluoride and a metal fluoride together with a boron compound selected from the group consisting of boric acid, boric oxide and metal borates.

3. In a destructible shell mold, a shell-shaped structure having porous shell walls and an inner cavity surface of a shape corresponding to an object to be cast, said shaped structure comprising as shell ingredients a predominant amount of refractory particles and the inner cavity surface having refractory material of sufficiently fine particle size to provide a relatively smooth inner surface and the fine refractory particles which form said inner cavity surface being selected from the group consisting of zirconium silicate, stabilized zirconia and mixtures thereof, which refractory particles in the inner shaped shell layer of the shaped structure are bound together by an inorganic raised temperature binder which is substantially free from phosphorus and phosphorus compounds and is effective as a binder for the refractory particles at intermediately high temperatures of at most 1200° C. and which is effective in resisting molten metal cast into the shell mold at high temperature, said shell mold having an outer supporting shell layer which is thicker than the inner shell layer and which is composed predominantly of refractory particles which contain fine particles mixed with a substantial portion of coarse particles and the refractory particles in the outer supporting layer being bound together by the reaction product of a phosphoric acid and the refractory particles, the total raised temperature binder in the superposed inner and outer shell layers being 0.5 to 7% of their solid shell ingredients, the overall thicknes of said superposed shell layers being at most about ¼ inch and said shell layers having been produced by driving off an organic low temperature binder with which the refractory particles have been originally bound whereby said superposed shell layers have such high porosity as to permit relatively free escape of gases developed in the mold cavity by molten metal cast into it.

4. In a destructible shell mold as claimed in claim 1, the inorganic binder of the applied investment composition which is free from phosphorus and phosphorus compounds comprising an alkali metal fluoride, said shaped structure also comprising a phenolformaldehyde condensation product in an amount ranging from about .3% to 3% by weight of the shell ingredients.

5. In a destructible shell mold as claimed in claim 1, said shell mold having an intermediate stratum disposed between the inner shell structure of the shell mold facing the mold cavity and the supporting shell structure of said shell mold, said intermediate stratum being free of said inorganic binder.

6. In a shell mold as claimed in claim 1, the inner shell layer of said shell mold containing as inorganic binder for the refractory particles a binder substance selected from the group consisting of a metal fluoride and a metal fluoride together with a boron compound selected from the group consisting of boric acid, boric oxide and metal borates.

7. In a shell mold as claimed in claim 6, said binder substance consisting of a metal fluoride together with said boron compound in proportions ranging by weight from six parts of the fluoride and one part of the boron compound to one part of the fluoride and three parts of the boron compound and which upon heating of the shell mold to said raised temperature causes a reaction whereby the refractory particles are bound by ingredients of said different binder.

8. In a shell mold as claimed in claim 1, the inner shell layer of said shell mold containing as inorganic binder for the refractory particles, an alkali metal fluoride and boric acid in proportions ranging by weight from 6 parts of the fluoride and 1 part of the boron compound to 1 part of the fluoride and 3 parts of the boron compound, and which upon heating said shell mold to said raised temperature causes a reaction whereby the refractory particles are bound by ingredients of the last-named inorganic binder.

9. In a shell mold as claimed in claim 8, said fluoride consisting of sodium fluoride.

10. In a shell mold as claimed in claim 1, the inner shell layer of said shell mold containing as inorganic binder for the refractory particles a binder substance consisting of an alkali metal fluoride and boric oxide in proportions, ranging by weight from six parts of the fluoride and six parts of the oxide to one part of the fluoride and three parts of the oxide, which upon heating the shell mold to said raised temperature causes the refractory particles to become bound by ingredients of said binder substance.

11. In a shell mold as claimed in claim 1, the inner shell layer of said shell mold containing as inorganic binder for the refractory particles a binder substance consisting of an alkali metal fluoride and a metal borate in proportions ranging by weight from six parts of the fluoride and one part of the borate to one part of the fluoride and three parts of the borate, which upon heating the shell mold to said raised temperature causes the refractory particles to become bound by ingredients of said binder substance.

12. In a shell mold as claimed in claim 2, the inner shell layer of said shell mold containing an inorganic binder consisting of a metal fluoride together with said boron compound in proportions ranging by weight from six parts of the fluoride and one part of the boron compound to one part of the fluoride and three parts of the boron compound and which upon heating of the shell mold to said raised temperature causes a reaction whereby the refractory particles are bound by ingredients of said different binder.

13. In a shell mold as claimed in claim 2, the inner shell layer of said shell mold containing as inorganic binder for the refractory particles an alkali metal fluoride and boric acid in proportions ranging by weight from 6 parts of the fluoride and 1 part of the boron compound to 1 part of the fluoride and 3 parts of the boron compound, and which upon heating the shell mold to said raised temperature causes a reaction whereby the refractory particles are bound by ingredients of the last-named inorganic binder.

14. In a shell mold as claimed in claim 13, said fluoride consisting of sodium fluoride.

15. In a shell mold as claimed in claim 2, said inner shell structure containing as inorganic raised temperature binder for the refractory particles a binder substance consisting of an alkali metal fluoride and boric oxide in proportions ranging by weight from six parts of the fluoride and one part of the oxide to one part of the fluoride and three parts of the oxide which upon heating the shell mold to said raised temperature causes the refractory particles to become bound by ingredients of said binder substance.

16. In a shell mold as claimed in claim 2, said inner shell structure cotaining as inorganic raised temperature binder for the refractory particles a binder substance consisting of an alkali metal fluoride and a metal borate in proportions ranging by weight from six parts of the fluoride and one part of the borate to one part of the fluoride and three parts of the borate which upon heating the shell mold to said raised temperature causes the refractory particles to become bound by ingredients of said binder substance.

17. In a shell mold as claimed in claim 3, said inner shell layer containing as inorganic raised temperature binder for the refractory particles a binder substance selected from the group consisting of a metal fluoride and a metal fluoride together with a boron compound selected from the group consisting of boric acid, boric oxide and metal borates.

18. In a shell mold as claimed in claim 3, said binder substance consisting of a metal fluoride together with said boron compound in proportions ranging by weight from six parts of the fluoride and one part of the boron compound to one part of the fluoride and three parts of the boron compound and which upon heating of the shell mold to said raised temperature causes a reaction whereby the refractory particles are bound by ingredients of said different binder.

19. In a shell mold as claimed in claim 3, the inner shell layer of said shell mold containing as inorganic binder for the refractory particles an alkali metal fluoride and boric acid in proportions ranging by weight from 6 parts of the fluoride and 1 part of the boron compound to 1 part of the fluoride and 3 parts of the boron compound, and which upon heating said shell mold to said raised temperature causes a reaction whereby the refractory particles are bound by ingredients of the last-named inorganic binder.

20. In a shell mold as claimed in claim 19, said fluoride consisting of sodium fluoride.

21. In a shell mold as claimed in claim 3, said inner shell structure layer containing as inorganic raised temperature binder for the refractory particles a binder substance consisting of an alkali metal fluoride and boric oxide in proportions ranging by weight from six parts of the fluoride and one part of the oxide to one part of the fluoride and three parts of the oxide which upon heating the shell mold to said raised temperature causes the refractory particles to become bound by ingredients of said binder substance.

22. In a shell mold as claimed in claim 3, said inner shell structure layer containing as inorganic raised temperature binder for the refractory particles a binder substance consisting of an alkali metal fluoride and a metal borate in proportions ranging by weight from six parts of the fluoride and one part of the borate to one part of the fluoride and three parts of the borate which upon heating the shell mold to said raised temperature causes the refractory particles to become bound by ingredients of said binder substance.

23. In a shell mold as claimed in claim 1, the inner shell layer facing said cavity being free of phosphorus and phosphorous compounds, said shell mold having an outer shell layer containing refractory particles of fine particle size mixed with refractory particles of relatively large particle size.

References Cited in the file of this patent

UNITED STATES PATENTS

| | | |
|---|---|---|
| 2,381,242 | Wood | Aug. 7, 1945 |
| 2,441,695 | Feagin et al. | May 18, 1948 |
| 2,521,614 | Valyi | Sept. 5, 1950 |

FOREIGN PATENTS

| | | |
|---|---|---|
| 575,734 | Great Britain | Mar. 4, 1946 |
| 585,665 | Great Britain | Feb. 18, 1947 |